Dec. 3, 1940.  J. V. VALLANCE  2,224,091

DRAFT MECHANISM OF TRACTORS

Filed Jan. 2, 1940

INVENTOR

J. V. VALLANCE

By Young, Emery & Thompson

ATTYS.

Patented Dec. 3, 1940

2,224,091

UNITED STATES PATENT OFFICE 2,224,091

DRAFT MECHANISM OF TRACTORS

John Vivian Vallance, Sea Lake, Victoria, Australia

Application January 2, 1940, Serial No. 312,142
In Australia January 12, 1939

7 Claims. (Cl. 280—33.44)

This invention relates to improvements in the draft mechanism of tractors of the type used for drawing ploughs and other farm implements or machinery and for hauling artillery and military wagons.

An important advance in connection with such tractors has already been made by the introduction of pneumatic-tired wheels in place of all-metal wheels having traction rims with ribs or studs for tractive reaction. While the adoption of pneumatic-tired wheels for tractors has been attended by many advantages, it has been found, with the conventional draft connections employed, that there is a decided tendency to slippage of the rear or driving wheels of the tractor and to lateral skidding of the front wheels during turning movements.

These defects which are most marked when a tractor operating in a soft, slippery or loose ground, greatly interfere with, or impede quick turning or manœuvring of the tractor and the object being hauled. Moreover, it is difficult to maintain that desired equalization of the draw-bar load on the two driving wheels of the tractor.

The present invention has been devised to obviate the defects hereinbefore briefly recited by providing an improved draft device which will replace the draw-bar as now generally provided on tractors by the manufacturers thereof.

Referring to the drawing which forms part of this specification:

Figure 1:
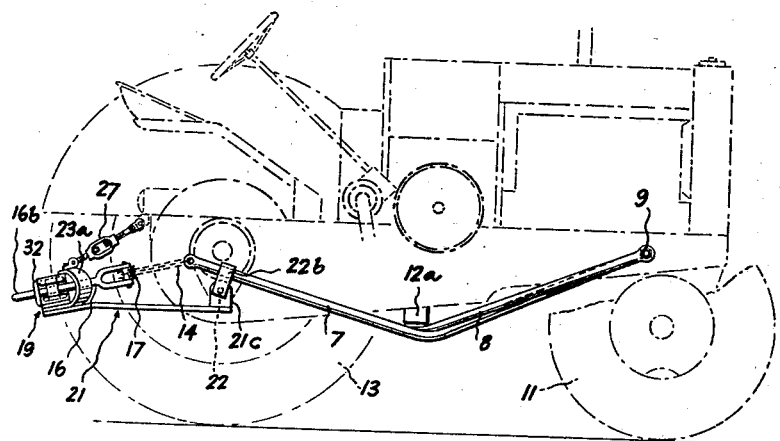
Figure 1 is a side elevation showing, in broken lines, the general outlines of a tractor and, in unbroken lines, a draft device according to a preferred form of the invention.

According to the illustrated embodiment of the invention, draft bars or rods 7, 8, are secured at their front ends to the frame or chassis of the tractor at opposite sides thereof and preferably near the front. As shown, the front end portions of these rods may be in substantially parallel relationship and be bolted or otherwise rigidly secured as at 9 to the front of the tractor on opposite sides of its longitudinal centre line and slightly rearwardly of the front or steering wheels 11.

The rods 7, 8 extend from their front ends first downwardly and rearwardly, thence underneath the tractor frame in diagonal fashion so that they cross each other as at 12 (Figure 2) centrally of the tractor as to its width and also approximately centrally as to its length. From the crossing point 12 the rods extend upwardly and outwardly towards their rear ends so that the rear end of each rod is located at the side of the tractor opposite to its front end. The rods preferably terminate substantially level with the rear or driving axle of the tractor and adjacent the rear or driving wheels 13 which, like the steering wheels 11, are preferably pneumatic tired. The said rear end portions of the rods 7, 8, may extend in parallel relationship and have fastened thereto a chain 14 or like flexible line which extends transversely of the tractor. This chain or like element should be sufficiently strong to transmit the draft or pull of the tractor.

A laterally swinging draw-bar 16 may have a forked front end 16a within which is mounted a pulley or roller 17, preferably flanged or having a concave peripheral face, which makes rolling contact with the front edge or face of the chain or like element 14.

The rear portion 16b of the draw-bar is adapted for connection to an implement or other object to be hauled and, for that purpose, may be apertured or of loop formation to receive a hook or other draft connection (not shown).

In order to sustain and guide the draw-bar 16 during its lateral swinging movements, it may be provided adjacent its rear end with ball or roller races 18 adapted to track along an arcuate guide member 19 that extends transversely in a longitudinal plane.

Figures 3, 4:
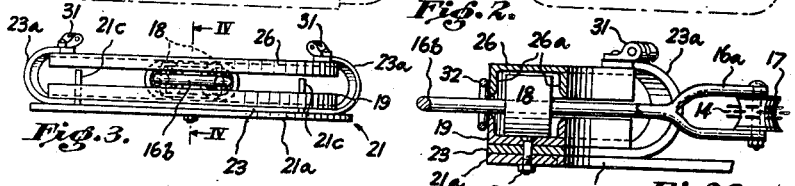
Figure 3 is a rear elevation of certain parts of the draft device.
Figure 4 is an enlarged cross section taken on line IV—IV of Figure 3.

The guide member 19 may, as best seen in Figures 3 and 4, consist of a length of channel section metal fashioned to the desired curve which may be assumed to be struck approximately from the point at which a straight line extending between the ends of the chain 14 would intersect the longitudinal centre line of the machine.

The guide member 19 may be rigidly supported by a bar-like frame 21 having a laterally curved rear portion 21a from which side portions 21b extend forwardly and have lugs 21c (best seen in Figure 5) at their front ends that may be retained by pivot pins 22 to some suitable rigid part of the tractor, for instance, the opposite sides of the differential or rear axle housing.

An intermediate curved bar 23 may extend between guide member 19 and the curved portion 21a of supporting frame 21, these parts being secured together as by countersunk bolts 24 (see Figure 4). The ends 23a of the intermediate bar may be curved upwardly and inwardly or backwardly so as to support an upper curved guide member 26 for the draw-bar races 18. As shown, the upper guide member 26 may be formed from a length of channel section metal having its side flanges 26a extending vertically downwards one at each side of the races 18.

Figures 5, 6:
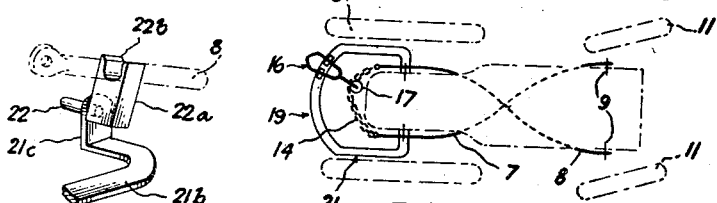
Figure 5 is a perspective view of certain parts of the device.
Figure 6 is a diagrammatic plan view illustrating the operation of the device when the tractor is turning from a straight path.

The heads 22a of the pins 22 may, as best seen in Figure 5, be relatively large and provided with open topped horizontally extending slots 22b in order to freely accommodate adjacent portions of the respective rods 7, 8 so as to prevent inadvertent lowering of said rods and to relieve them of a certain amount of strain to which they would otherwise be subject.

The guide frame or support 21 and associated parts may be adjustably supported by a pair of turnbuckle devices 27 that extend from arms 28 pivoted about a spindle 29 extending transversely at the rear of the tractor, to forked apertured lugs 31, secured to the upturned ends 23a of member 23.

Figure 2:
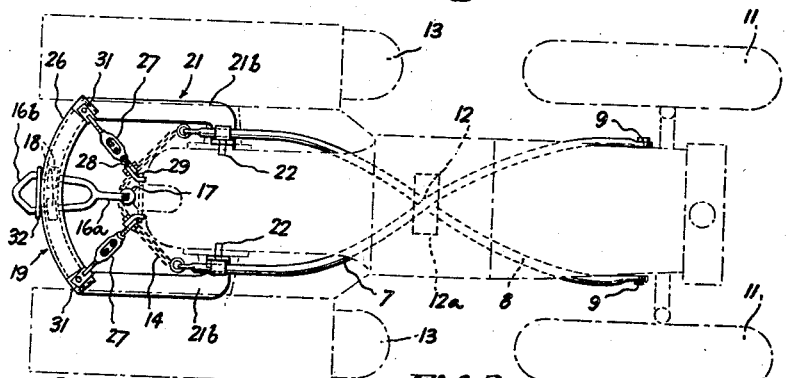
Figure 2 is a plan of Figure 1.

When the tractor and the drawn implement or other object are proceeding along a straight path the draw-bar 16 will occupy a central position as seen in Figure 2 with the result that the load or draft will be distributed evenly to the draft rods 7, 8. When negotiating a curve or bend as indicated in Figure 6, however, the draw-bar 16 will swing laterally in the direction into which the tractor is being steered and cause the roller 17 to roll in the same direction along the front face or edge of the chain 14. In this manner, the major proportion of the draft will be transmitted by that draft rod having its rear end at that side of the longitudinal centre line of the tractor to which the draw-bar has been swung. Owing to the draft rods extending diagonally as aforesaid, the reaction of the major proportion of the draft is transmitted to the opposite side of the tractor near the front thereof. This has the effect of preventing "brushing" or lateral skidding of the front wheels 11, and greatly facilitates steering by enabling the tractor and the drawn object to be quickly turned or steered within a small radius.

Slipping of the driving wheels 13 of the tractor is also minimised even when travelling over soft or loose ground due to the fact that the rear ends of the rods 7, 8, are located above, and the crossing point 12 of the rods 7, 8, is located below, a straight line extending between the rear of the draw bar 16 and the front end of either rod. By such an arrangement the rear part of the tractor is subjected to a downward pressure through the rods 7, 8, the extended heads of pins 22 and the differential or rear axle housing, with the result that effective traction is maintained between the rear wheels 13 and the ground. To obtain the maximum benefit from such an arrangement, the rear ends of the rods should be located as high as conveniently possible, say level with the driving axle, while the crossing point of the rods should be located as low as conveniently possible for which latter purpose a bearing plate 12a may be secured to the underpart of the tractor so that its lower surface contacts with the upper surfaces of the rods at their crossing point.

While it is preferred to employ the diagonal draft rods 7, 8, as aforesaid, they may in some cases be dispensed with, in which event the ends of the chain 14 would be rigidly connected to opposite sides of the tractor chassis or frame or to brackets or lugs outstanding therefrom.

A buffer or stop member 32 may be secured to and extend laterally across the rear end of the draw-bar 16 and behind the guide member 19 in order to prevent the draw-bar being forced forwardly, by over-running of the drawn implement or machine, and damaging the differential or rear axle housing of the tractor.

A retainer bar (not shown) may be secured to the guide frame 21 and extend freely through the forked front end 16a of the draw-bar in order to prevent the said front end from dropping. In some cases, particularly for large tractors engaged in heavy work, an upper retaining bar which is relatively massive may be provided together with a lower bar which may be comparatively light.

In applying the invention to certain makes of tractors it is necessary or advisable, owing to the presence of various attachments on the tractor bodies, to dispense with the forward portions of the rods 7 and 8. In such cases the bearing plate 12a may be replaced by a block or strap which is made fast to the tractor at or about the point 12. The front ends of the rods would be secured to such block or strap and they would extend rearwardly, either diagonally or parallel with each other, and may pass beneath the rear axle as illustrated in Figure 1 or, if desired, above the axle. In any event the rods may extend through the slots 22b in the heads of pins 22 as seen in Figure 5.

Having now described my invention what I claim as new and desire to secure by Letters Patent is:

1. An improved draft device for tractors, comprising in combination, a flexible track member having its ends adapted for connection to a rigid part of the tractor at opposite sides of its longitudinal center line so that the track member extends transversely adjacent the rear of the tractor, a draw-bar adapted at its front to make rolling contact with the front face of said track member, said draw-bar being adapted at its rear end for connection to an implement to be hauled, whereby under working conditions the track member is maintained substantially taut so as to transmit the pull of the tractor to the draw-bar which remains in a central position while the tractor is proceeding along a straight path, but will, during turning of the tractor, swing laterally in the direction in which the tractor is being steered and cause the front end of the draw-bar to roll in the same direction along the flexible track member, a support and guide for the rear part of said draw-bar comprising a bar adapted to be secured to a part of the tractor and having a curved portion that extends laterally, and anti-friction means carried by the rear of said draw-bar adapted to track along said curved laterally extending portion.

2. An improved draft device for tractors, comprising in combination, a flexible track member having its ends adapted for connection to a rigid part of the tractor at opposite sides of its longitudinal centre line so that the track member extends transversely adjacent the rear of the tractor, a draw-bar adapted at its front to make rolling contact with the front face of said track member, said draw-bar being adapted at its rear end for connection to an implement to be hauled, a frame having side members adapted to be pivotally connected at their front ends to a rigid part of the tractor at opposite sides thereof, said frame having an intermediate curved portion that extends laterally at the rear of the tractor, and a roller on said draw-bar adapted to track along said curved portion of the frame.

3. An improved draft device for tractors, comprising in combination, a pair of draft rods adapted at their front ends for connection to rigid parts of the tractor at opposite sides thereof with the rear ends of said rods disposed in laterally spaced relationship towards the rear of the tractor, a flexible track member having its ends connected to the rear ends of said rods so that it extends transversely adjacent the rear of the tractor, and a draw-bar adapted at its front to make rolling contact with the front face of said track member, said draw-bar being adapted at its rear end for connection to an implement or the like to be hauled, a frame having side members, pivot pins for connecting said side members to the tractor at opposite sides thereof, said frame having an intermediate curved portion that extends laterally at the rear of the tractor, and a roller on said draw-bar adapted to track along said curved portion of the frame, said pivot pins having heads provided with slots through which rear end portions of said rods extend.

4. An improved draft device for tractors of the kind provided with a power driven rear axle and differential gear, comprising in combination a pair of draft rods adapted at their front ends for connection to a rigid part of the front of the tractor at opposite sides thereof, the said rods extending first diagonally and downwardly to the rear so as to cross each other at a lower point beneath the tractor and thence extending diagonally and upwardly to their rear ends which are disposed in laterally spaced relationship adjacent said rear axle and at opposite sides to their front ends, said rear ends of the rods being at a level substantially higher than their crossing point, a flexible track member passing around and substantially close to the rear of the differential gear housing of the tractor and having its ends connected, respectively, to the rear ends of said draft rods, a draw-bar adapted at its front end to make rolling contact with the front face of the said flexible track member, and a self-aligning and anti-friction device for supporting and guiding the rear of the draw-bar, all of the parts being disposed within the dimensional confines of the tractor.

5. A draft device according to claim 4, in which the said supporting and guiding device has forwardly projecting portions that are pivotally connected at their front ends to a fixed part of the tractor at opposite sides thereof, and adjustable supporting elements extend between said device and fixed parts of the tractor in order to permit self-aligning of the said device in a vertical direction.

6. A draft device according to claim 4, in which a bearing plate is positioned between the underpart of the tractor and the crossing portions of said draft rods.

7. A draft device according to claim 4, wherein said supporting and guiding device includes a curved bar that extends laterally; and wherein said draw-bar is provided near its rear end with anti-friction rollers adapted to track along said curved bar.

JOHN VIVIAN VALLANCE.